(12) United States Patent
Ferrell

(10) Patent No.: US 7,597,871 B2
(45) Date of Patent: Oct. 6, 2009

(54) STEAM MODIFIED CLAUS PROCESS

(75) Inventor: William P. Ferrell, Tyler, TX (US)

(73) Assignee: Goar, Allison & Associates, Inc., Tyler, TX (US)

( * ) Notice: Subject to any disclaimer, the term of this patent is extended or adjusted under 35 U.S.C. 154(b) by 348 days.

(21) Appl. No.: 11/036,284

(22) Filed: Jan. 13, 2005

(65) Prior Publication Data

US 2006/0153767 A1 Jul. 13, 2006

(51) Int. Cl.
*C01B 17/04* (2006.01)

(52) U.S. Cl. .................. 423/573.1; 423/576.8

(58) Field of Classification Search ............. 423/573.1, 423/576.8
See application file for complete search history.

(56) References Cited

U.S. PATENT DOCUMENTS

| | | | |
|---|---|---|---|
| 3,617,221 A * | 11/1971 | Egan et al. ............... | 423/574.1 |
| 3,681,024 A | 8/1972 | Hujsak et al. | |
| 3,822,341 A | 7/1974 | Smith | |
| 4,153,674 A | 5/1979 | Verloop et al. | |
| 4,487,753 A * | 12/1984 | Massie et al. ............ | 423/576.6 |
| 4,526,590 A | 7/1985 | Palm et al. | |
| 4,552,747 A | 11/1985 | Goar | |
| 4,756,900 A | 7/1988 | Pendergraft | |
| 5,514,351 A * | 5/1996 | Buchanan et al. ........... | 423/220 |
| 6,287,535 B1 * | 9/2001 | Schendel ................. | 423/573.1 |
| 6,508,998 B1 | 1/2003 | Nasato | |
| 6,569,398 B2 | 5/2003 | Fenderson | |
| 7,172,746 B1 * | 2/2007 | Rischard .................. | 423/573.1 |

OTHER PUBLICATIONS

Arthur L. Kohl et al. "Gas Purification" 5th Ed. (1997) Gulf Publishing Co., Book Division, P. O. Box 2608, Houston, Texas 77252-2608; ISBN 0-88415-220-0; pp. 671-674 and 689-694.*

* cited by examiner

*Primary Examiner*—Timothy C Vanoy
(74) *Attorney, Agent, or Firm*—Geoffrey L. Chase

(57) ABSTRACT

Disclosed is a method for treating a gas stream rich in hydrogen sulfide by providing one or more feed gas streams rich in hydrogen sulfide into a Claus reaction furnace, providing air into the Claus reaction furnace, providing supplemental oxygen into the Claus reaction furnace, and providing steam to the Claus reaction furnace, where the steam is in addition to any steam that may be present in gases that are recycled to the Claus reaction furnace. The components are then reacted at a temperature above about 2400° F. and at a pressure sufficient to cause hydrogen sulfide to be converted into sulfur.

19 Claims, 1 Drawing Sheet

STEAM MODIFIED CLAUS PROCESS

BACKGROUND OF THE INVENTION

1. Field of the Invention

This invention relates to the chemical arts. More particularly, this invention relates to a process and system for recovering sulfur from a gas stream rich in hydrogen sulfide.

2. Discussion of the Related Art

It is known in the prior art to recover elemental sulfur from hydrogen sulfide ($H_2S$)—containing acid gas streams as is set forth in the article "Fundamentals of Sulfur Recovery by the Claus Process" by B. Gene Goar, published in the 1977 Gas Conditioning Conference Report. The Claus reaction is represented by the following equation:

$$4H_2S + 2SO_2 \rightarrow 3S_2 + 4H_2O \qquad \text{(Equation 1)}$$

Claus sulfur recovery units (SRU's) are widely utilized to recover sulfur from acid gas streams produced in natural gas purification and in petroleum refineries, primarily from amine sweetening. In refineries, the $H_2S$ is in crude oil and is contained in hydrocarbon desulphurization unit off gases and fluidized catalytic cracker unit off gases. Oftentimes, the acid gas stream produced from the amine unit is quite rich in $H_2S$, particularly in petroleum refineries, where it may be 80-95 mol % $H_2S$. Also in many refineries, the Claus plant units are either fully loaded or subject to becoming fully loaded (capacity limited) due to the processing of heavy crude oils, which contain relatively large amounts of sulfur compounds. With the dwindling known reserves of refinable hydrocarbons and crude oils, less attractive known oil reserves are now being processed, which less attractive oil reserves typically have high sulfur contents. The trend in refining such high sulfur containing feedstocks will increase in the future. Additionally, the requirements to produce lower sulfur fuels will result in more acid gases containing $H_2S$. Therefore, it is a desideratum to increase the capacity of Claus plants to process sulfur.

In conventional Claus sulfur recovery systems, the feed pressure of the acid gas feed stream is only about 12 psig. This low pressure level does not provide enough driving force to allow a significant increase in the amount of acid gas feed that can be passed through the many items of equipment that constitute a typical Claus SRU. As Claus SRU feed rates are increased above capacity, several problems develop. At increased flow, the pressure drop through the Claus plant and tail gas cleanup unit increases, and the back pressure increase requires $H_2S$ and air feed inlet pressures beyond what is available from the amine regenerator that supplies the acid gas feed and the air blower that provides feed air. The increased flow also decreases the residence times and increases the space velocity in the reaction furnace and the catalytic reactor stages, which reduces conversion to sulfur and increases emissions to the tail gas cleanup unit. The increased flow also results in overloading some or all of the heat exchangers in the SRU, which may reduce conversion of $H_2S$ to sulfur and also increases sulfur vapor carryover to the tail gas unit. The increased flow to the tail gas cleanup unit increases its pressure drop and further lowers tail gas sulfur recovery, which ultimately leads to increased and usually unacceptable sulfur emissions. The increased back pressures may in some Claus plants pose the risk of blowing the liquid sulfur drain seals, which would release process gas containing highly toxic $H_2S$ into the atmosphere. While booster blowers for the $H_2S$ and air feeds, and higher pressure sulfur liquid drain seals can provide some increase in capacity, these measures will not overcome problems associated with undersized heat exchange equipment, reduced sulfur conversion, or increased sulfur emissions.

It is also known to use oxygen enrichment in the operation of a Claus sulfur plant in order to increase the capacity of $H_2S$ handled as well as the total throughput of the plant as set forth in the article "Oxygen Use in Claus Sulfur Plants" by M. R. Gray and W. Y. Svrcek published in the 1981 Gas Conditioning Conference Report. In that article, it was disclosed that oxygen can be added in the air feed to the burner of a Claus reaction furnace in order to increase the amount of $H_2S$ which is combusted to sulfur dioxide ($SO_2$) for later catalytic conversion, with additional hydrogen sulfide to the elemental liquid sulfur product of the Claus process. The combustion reaction of $H_2S$ with oxygen (whether pure oxygen or air) can be represented by the following equation:

$$2H_2S + 3O_2 \rightarrow 2SO_2 + 2H_2O \qquad \text{(Equation 2)}$$

The Gray and Svrcek article recites that the pressure drop through the plant and the reactor space velocities determine the maximum capacity increase which can be achieved with oxygen enrichment. Consequently, it is a desideratum to improve efficiency by reducing the amount of air, thereby maximizing the amount of oxygen available to react with the $H_2S$.

However, a further limitation set forth in the Gray and Svrcek article is that for a given plant stream, temperatures and sulfur condenser capacity may limit the potential capacity increase using oxygen enrichment. Specifically, stream temperatures in the reaction furnace and in the converter beds may increase due to oxygen enrichment and, in fact, such increase from oxygen enrichment reaches the maximum tolerable temperature of the materials used in such a furnace, namely the refractory lining. Similarly, in the 1983 publication by Linde of Union Carbide entitled "Claus Plant Oxygen Enrichment," it is noted that oxygen-enrichment limitations exist for $H_2S$-rich streams due to temperature limits in the furnace or waste heat boiler of a Claus plant. Therefore, it is also a desideratum to moderate the temperature in the Claus reaction furnace.

It is also known in the prior art to recycle effluent gases back into the Claus reaction furnace. For example, U.S. Pat. No. 3,681,024 discloses the addition of oxygen and a recycle gas to a Claus reaction furnace. Combustion gases from a reactor unit are first sent to a water scrubber to reduce the water content of the effluent, and a sufficient amount of the scrubber off-gases are then recycled to dilute the oxygen feed so that furnace conditions are essentially equivalent to operation with air.

U.S. Pat. No. 3,822,341 describes a Claus plant using oxygen enrichment in which water is removed from the combustion gases, first in a liquid vapor contractor and then in an $SO_2$ stripper, before the reaction gases are recycled to a waste heat boiler.

U.S. Pat. No. 4,756,900 discloses a process for splitting the effluent from the waste heat boiler of a Claus reaction furnace and recycling a portion thereof using a separate sulfur condenser and a mechanical blower to moderate the high furnace temperatures induced by oxygen enrichment.

U.S. Pat. No. 4,552,747 describes a process for moderating the high temperatures in a Claus reaction furnace induced by oxygen-enrichment by passing reaction gases through a sulfur condenser and then using a mechanical blower to recycle the resulting effluent stream back to the Claus reaction furnace. U.S. Pat. No. 6,508,998 describes a process for moderating the high temperatures in a Claus reaction furnace induced by oxygen-enrichment by passing reaction gases through a sulfur condenser and then using an eductor to recycle the resulting effluent stream back to the Claus reaction furnace. In some embodiments, steam is used to provide the motive power for the eductor.

There remains a definite need for a simple and effective system and process for recovering elemental sulfur from $H_2S$-containing gas streams that minimizes the amount of air required in a Claus reaction furnace. There remains a further definite need for such a system and process that allows the processing of more acid gas through the system. There remains a still further definite need for such a system and process that moderates the temperature in the Claus reaction furnace. The present invention satisfies these and other needs, and provides further related advantages.

SUMMARY OF THE INVENTION

Now in accordance with the invention there has been found a simple and effective system and process employing steam to minimize the amount of air required in a Claus reaction furnace, to maximize the feed rate of the acid gas stream, and to moderate the temperature in the furnace. The method includes providing one or more fuel gas streams rich in $H_2S$ into a Claus reaction furnace, providing air into the Claus reaction furnace, providing supplemental oxygen into the Claus reaction furnace, and providing steam to the Claus reaction furnace, where the steam is in addition to any steam that may be present in gases that are recycled to the Claus reaction furnace. The components are then reacted at a temperature above about 2400° F., preferably above about 2600° F., and at a pressure sufficient to cause hydrogen sulfide to be converted into sulfur.

The concentration of hydrogen sulfide in the fuel gas stream is from about 50 mol % to about 95 mol %. The concentration of oxygen contained in the sum of the oxygen stream and the air stream entering the Claus reaction furnace is typically from about 25 mol % to about 100 mol %, preferably from about 35 mol % to about 95 mol %. The amount of steam provided to the Claus reaction furnace is typically from about 5 moles of steam per 100 moles of acid gas to about 100 moles of steam per 100 moles of acid gas, preferably from about 10 moles of steam per 100 moles of acid gas to about 50 moles of steam per 100 moles of acid gas.

In some embodiments, the Claus reaction furnace includes a burner and a reaction furnace. In some embodiments, the steam is introduced directly into the burner, while in alternate embodiments, the steam is introduced directly into the reaction chamber. Also in some embodiments, the steam is combined with one of the gas streams rich in hydrogen sulfide, the air, or the oxygen, before being introduced into the burner, while in alternative embodiments, the steam is combined with one of the gas streams rich in hydrogen sulfide, the air, or the oxygen, before being introduced into the burner.

DETAILED DESCRIPTION OF THE PREFERRED EMBODIMENTS

Figure 1:
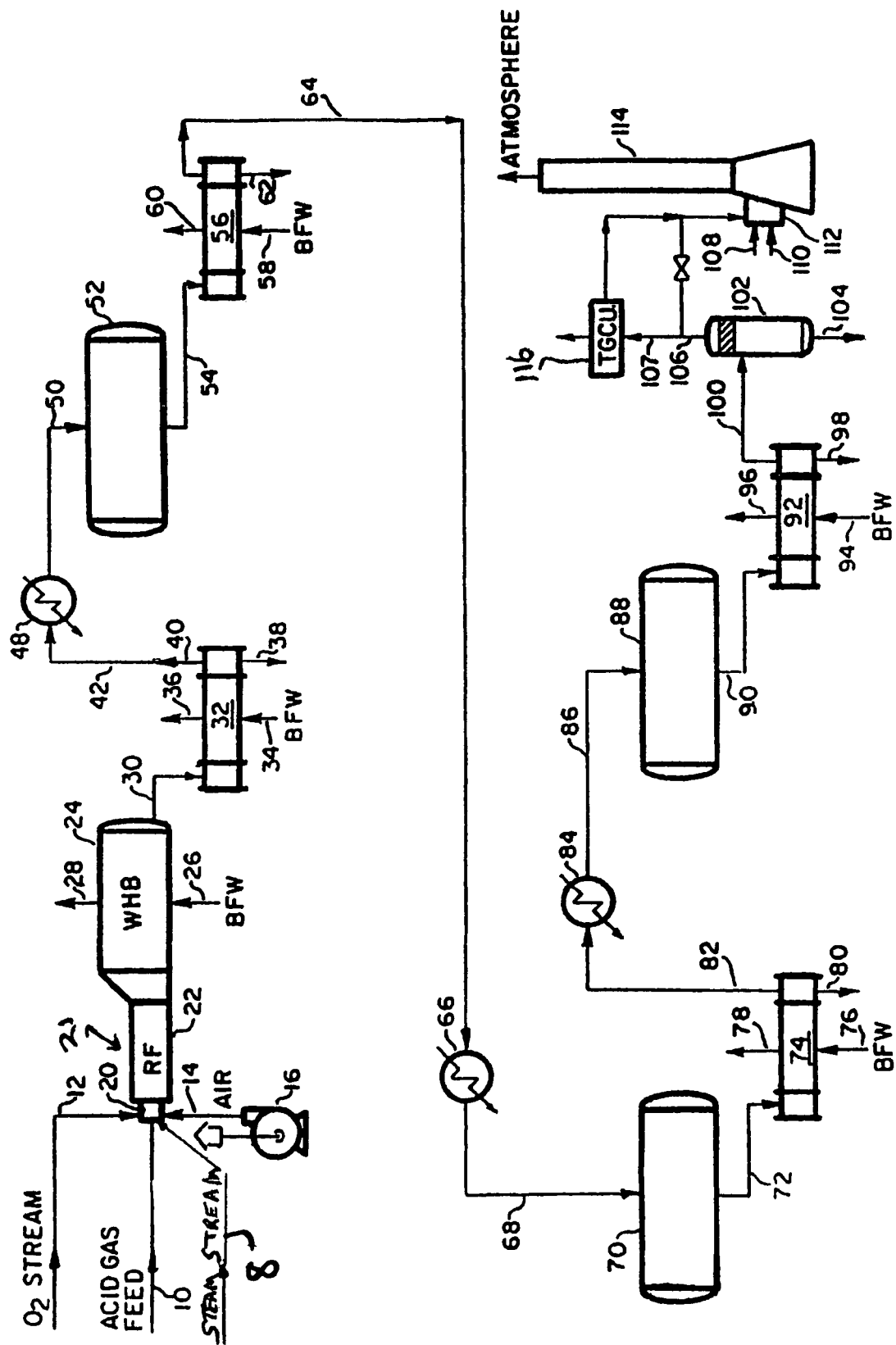
FIG. 1 is a flow diagram of a Claus reactor system in accordance with the invention.

Particular embodiments of the invention are described below in considerable detail for the purpose of illustrating its principles and operation. However, various modifications may be made, and the scope of the invention is not limited to the exemplary embodiments described below. For example, in the embodiments described below, there is described a reaction furnace that includes both a burner and a reaction chamber and the reactants are introduced into the burner. However, one skilled in the art will understand that the reactants can be introduced directly into a reaction chamber. Similarly, in the embodiments described below, only one acid gas feed stream is shown. One skilled in the art will understand that the acid gas can be supplied in one or more streams.

Shown in FIG. 1 is a Claus reactor system in accordance with the invention. An acid gas feed stream rich in $H_2S$ is introduced from an acid gas source, such as the acid gas produced by a petroleum refining plant (not shown), through at least one acid gas feed line 10 into a Claus reaction furnace 21. In the embodiment shown in FIG. 1, the Claus reaction furnace includes a burner 20 and a reaction chamber 22, such that the reactants are combusted in burner 20 and evolved into the reaction furnace 22.

Typically, the $H_2S$ content of such feed streams is from about 50 to about 95 mol %. The feed stream is introduced into the reaction furnace 21 at a temperature generally of from about 60 to about 150° F., preferably from about 80° to about 130° F., and more preferably from about 90° to about 120° F., and at a pressure generally of from about 20 to about 30 psia, preferably from about 22 to about 28 psia, and more preferably from about 23 to about 27 psia.

An oxygen stream, such as a stream of commercially pure oxygen or oxygen-enriched air, is provided to the reaction furnace 21 through an oxygen supply line 12. In the embodiment shown in FIG. 1, a stream of commercially pure oxygen is provided by the oxygen supply line, while an air stream is separately provided through air supply line 14 at an elevated pressure, typically of from about 20 to about 30 psia, preferably from about 22 to about 28 psia, and more preferably from about 23 to about 27 psia, from compressor 16.

The concentration of oxygen contained in the sum of oxygen stream 12 and air stream 14 entering the Claus reaction furnace 21 is typically from about 25 mol % to about 100 mol %, preferably from about 35 mol % to about 95 mol %. It is a significant advantage in accordance with the invention that the oxygen concentration in the Clause reaction furnace can be increased above the levels of those employed in conventional Claus recovery systems. In turn, the capacity of the Claus plant is increased due to the increased oxygen, which backs out air flow.

Steam from a source, such as the plant utility distribution system, is provided to the reaction furnace 21 through steam supply line 8. In alternative embodiments, the steam can be combined with the gas feed in the acid gas feed line 10, the air in air supply line 14 or the oxygen in oxygen supply line 12, before the resulting mixture is directed into the burner. It is a feature of the process and system in accordance with the invention that the steam supply line does not provide any recycled gases.

The molar ratio of steam to feed gas is preferably in the range of from about 5 moles steam to about 100 moles feed gas to about 100 moles steam to about 100 moles feed gas and more preferably from about 10 moles steam to about 100 moles feed gas to about 50 moles steam to about 100 moles feed gas, and still more preferably from about 15 moles steam to about 100 moles feed gas to about 20 moles steam to about 100 moles feed gas.

The resulting reactant mixture is combusted in burner 20 and evolved into reaction chamber 22, of the reaction furnace 21, where the reactions of the oxygen-enhanced Claus process occur. The operating temperature in the reaction chamber is preferable at a temperature greater than about 2400° F., and more preferably greater than about 2600° F.

As illustrated in the combustion reaction (Equation 2), oxygen contained in the air and/or oxygen streams reacts with some of the $H_2S$ in the acid gas feed stream to produce $SO_2$ and $H_2O$. It can be seen from the stoichiometry of the Claus reaction (Equation 1), that the combustion reaction consumes about one-third of the $H_2S$ initially contained in the acid gas feed stream. The $SO_2$ produced in accordance with the combustion reaction then reacts with some of the remaining $H_2S$ in accordance with Equation 1 to produce $S_2$ and more $H_2O$.

The resulting combustion effluents are then passed through a circuitous heat exchange zone or waste heat boiler 24 wherein the effluents are cooled against boiler feed water in line 26, which then produces steam in line 28. Typically, the temperature of the cooled effluents are from about 450° F. to about 750° F., preferably from about 550° F. to about 650° F. In the waste heat boiler 24, the sulfur is converted from one form of sulfur species to other forms according to the following equations:

$$3S_2 \rightarrow S_6 \quad \text{(Equation 3)}$$

$$4S_2 \rightarrow S_8 \quad \text{(Equation 4)}$$

The cooled effluents are carried from the waste heat boiler through line 30 at a pressure of from about 20 to about 26 psia, preferably from about 22 to about 24 psia, and introduced into a first liquid sulfur condenser 32. The combustion effluents are again heat exchanged to further cool the effluents against boiler feed water in line 34, which produces steam in line 36. The resulting liquid sulfur is condensed out in line 38. The elemental sulfur remaining in the effluents constitutes from about 40% to about 75% of the sulfur in the original acid gas feed.

The gaseous combustion effluents are removed in line 40 at a temperature of from about 330° F. to about 390° F., preferably from about 350° F. to about 370° F. and at a pressure generally of from about 19 to about 25 psia, preferably from about 21 to about 23 psia.

Those effluents that still remain are carried through line 42 to be reheated in a first reheater heat exchanger 48 with process steam. The effluents, now in line 50, have a temperature of from about 400° F. to about 500° F., preferably from about 440° F. to about 460° F., and are then introduced into a first catalytic converter reactor 52 wherein residual $H_2S$ and $SO_2$ are reacted to produce sulfur species and water according to the following equations:

$$12H_2S + 6SO_2 \rightarrow 3S_6 + 6H_2O \quad \text{(Equation 5)}$$

$$16H_2S + 8SO_2 \rightarrow 3S_8 + 16H_2O \quad \text{(Equation 6)}$$

The thus reacted effluent stream, now in line 54, is introduced into a second sulfur condenser 56, which again cools the effluent stream with boiler feed water in line 58 to produce additional steam in line 60. This additional elemental sulfur is recovered in line 62. The amount of elemental sulfur remaining in the effluent stream constitutes from about 18% to about 50% of the sulfur in the original acid gas feed.

The further condensed effluent stream is carried from the second condenser through line 64 at a temperature of from about 310° F. to about 370° F., preferably from about 330° F. to about 350° F., and at a pressure generally of from about 18 to about 24 psia, preferably from about 20 to about 22 psia, into a second reheater, heat exchanger 66, where the condenser effluent stream is heated with high pressure steam to a temperature of from about 400° F. to about 460° F., preferably from about 420° F. to about 440° F. The thus reheated stream is then carried through line 68 and introduced into a second catalytic converter reactor 70, wherein the catalytic reaction between hydrogen sulfide and $SO_2$ represented in Equations 5 and 6, again occur. The thus reacted effluent stream, now in line 72, goes to a third sulfur condenser 74 which is cooled with boiler feed water 76 to produce steam in line 78. The resulting liquid sulfur is removed in line 80. The amount of elemental sulfur in the effluent stream constitutes from about 5% to about 15% of the sulfur in the original acid gas feed.

The effluent stream, now in line 82, at a temperature of from about 300° F. to about 350° F., preferably from about 315° F. to about 335° F. and at a pressure of from about 17 to about 22 psia, preferably from about 18 to about 21 psia, is reheated in a third reheater heat exchanger 84. The effluent stream is heated with process steam to a temperature of from about 370° F. to about 420° F., preferably from about 390° F. to about 410° F. The thus reheated stream is then carried through line 86 and introduced into a third catalytic converter reactor 88. In the third catalytic converter reactor, substantially all or most of the remaining $H_2S$ and $SO_2$ are reacted to produce sulfur species as represented in equations 5 and 6, which are then removed in line 90. The effluent is introduced into a fourth condenser 92 cooled by boiler feed water in line 94 producing steam in line 96. Further elemental sulfur in liquid form is removed in line 98 constituting from about 1% to about 6% of the sulfur in the original acid gas feed.

The effluent stream now in line 100 is at a temperature of from about 255° F. to about 330° F., preferably from about 265° F. to about 320° F. and at a pressure of from about 15 to about 20 psia, preferably from about 17 to about 19 psia.

The resulting effluent stream comprises predominantly steam, nitrogen, carbon dioxide, and hydrogen, as well as residual $H_2S$ and other sulfur compounds. The stream is carried in line 100 into a tail gas coalescer 102 wherein additional residual liquid sulfur compounds are removed in line 104. The residual stream now in line 106 is then introduced into a tail gas cleanup unit 116, where the bulk of the residual sulfur compounds are recovered to meet sulfur emission environmental standards typically by conversion to $H_2S$. The $H_2S$, is recovered and returned to the acid gas feed line 10, while the effluent is sent to an incinerator burner 112.

Alternately, the tail gas in line 106 is sent to an incinerator burner 112 that is fired with natural gas in line 108 and air in line 110. The materials are then vented in stack 114, at an acceptable sulfur content level, as an effluent to the atmosphere.

Now in accordance with the invention, it has been found that the capacity of the SRU to process acid gas feed can be increased. The elimination of $H_2S$ mixture is enhanced when steam is included in the reaction mixture. Without wishing to be bound by the theory of the invention, it is thought that the addition of steam causes the following overall reaction to occur to a significant extent:

$$H_2S + 2H_2O \rightarrow 3H_2 + SO_2 \quad \text{(Equation 7)}$$

Because this reaction is endothermic, the temperature in the reaction furnace is decreased to a greater degree by the addition of a quantity of steam, than if the same quantity of an inert gas coolant were added. This allows operation at a higher oxygen concentration by adding more pure oxygen, thereby decreasing the air requirement. The further substitution of oxygen for air allows an increase in the amount of acid gas feed that can be processed without exceeding the furnace refractory temperature limit and without having to recycle any of the combustion effluent. In accordance with the inventive procedure, the amount of additional acid gas that can be processed through an SRU will typically range from 10% to 30%, depending on the composition of the acid gas feed.

Furthermore, not only can the reaction with steam, as shown in Equation (7), increase the capacity of the SRU to consume H₂S, but also by producing SO₂, it decreases the amount of SO₂ that must be produced using oxygen in accordance with Equation 2. This minimizes the total oxygen required in the furnace. Therefore, the total oxygen demand is decreased for a given amount of acid gas feed.

The present invention has been described with regard to preferred embodiments, but those skilled in the art will be capable of contemplating other variants, which are deemed to be within the scope of the invention, which scope should be ascertained from the claims, which follow.

I claim:

1. A method for treating a gas stream rich in hydrogen sulfide comprising:
   providing one or more acid gas feed streams rich in hydrogen sulfide into a Claus reaction furnace;
   providing air into the Claus reaction furnace;
   providing supplemental oxygen into the Claus reaction furnace;
   providing steam to the Claus reaction furnace; and
   reacting at a temperature above about 2400° F. and at a pressure sufficient to cause hydrogen sulfide to be converted into sulfur, where no recycled steam is provided into the Claus reaction furnace, wherein the Claus reaction furnace includes a burner and a reaction chamber and the steam is introduced directly into the reaction chamber.

2. A method for treating a gas stream rich in hydrogen sulfide comprising:
   providing one or more acid gas feeds streams rich in hydrogen sulfide into a Claus reaction furnace;
   providing air into the Claus reaction furnace;
   providing supplemental oxygen into the Claus reaction furnace, the total concentration of oxygen contained in the sum of the oxygen stream and the air stream entering the in the Claus reaction furnace is from about 95 mol % to about 100 mol %;
   providing steam to the Claus reaction furnace, so that the amount of steam is from about 5 moles of steam per 100 moles of acid gas to about 100 moles of steam per 100 moles of acid gas; and
   reacting at a temperature above about 2600° F. and at a pressure sufficient to cause hydrogen sulfide to be converted into sulfur, wherein the Claus reaction furnace includes a burner and a reaction chamber and the steam is introduced directly into the reaction chamber and wherein no recycled steam is provided into the Claus reaction furnace.

3. A method for treating a gas stream rich in hydrogen sulfide comprising:
   providing one or more acid gas feed streams rich in hydrogen sulfide into a Claus reaction furnace;
   providing air into the Claus reaction furnace;
   providing supplemental oxygen into the Claus reaction furnace;
   providing recycled steam into the Claus reaction furnace;
   providing nonrecycled steam into the Claus reaction furnace; and
   reacting at a temperature above about 2400° F. and at a pressure sufficient to cause hydrogen sulfide to be converted into sulfur.

4. The method in accordance with claim 3 wherein the temperature is above about 2600° F.

5. The method in accordance with claim 3 wherein the concentration of hydrogen sulfide in the gas stream is from about 50 mol % to about 95 mol %.

6. The method in accordance with claim 3 wherein the concentration of oxygen contained in the sum of the oxygen stream and the air stream is from about 25 mol % to about 100 mol %.

7. The method in accordance with claim 3 wherein the concentration of oxygen contained in the sum of the oxygen stream and the air stream is from about 35 mol % to about 95 mol %.

8. The method in accordance with claim 3 wherein the Claus reaction furnace includes a burner and a reaction chamber and wherein the nonrecycled steam is introduced directly into the burner.

9. The method in accordance with claim 3 wherein the Claus reaction furnace includes a burner and a reaction chamber and the nonrecycled steam is introduced directly into the reaction chamber.

10. The method in accordance with claim 3 wherein the Claus reaction furnace includes a burner and a reaction chamber and the nonrecycled steam is combined with one of the gas feed streams rich in hydrogen sulfide, the air, or the oxygen, before being introduced into the burner.

11. The method in accordance with claim 3 wherein the Claus reaction furnace includes a burner and a reaction chamber and the nonrecycled steam is combined with the gas feed stream rich in hydrogen sulfide, before being introduced into the reaction chamber.

12. The method in accordance with claim 3 wherein the amount of steam provided to the Claus reaction furnace is from about 5 moles of steam per 100 moles of acid gas to about 100 moles of steam per 100 moles of acid gas.

13. The method in accordance with claim 3 wherein the amount of steam provided to the Claus reaction furnace is from about 10 moles of steam per 100 moles of acid gas to about 50 moles of steam per 100 moles of acid gas.

14. A method for treating a gas stream rich in hydrogen sulfide comprising:
   providing one or more acid gas feed streams rich in hydrogen sulfide into a Claus reaction furnace;
   providing air into the Claus reaction furnace;
   providing supplemental oxygen into the Claus reaction furnace, the total concentration of oxygen contained in the sum of the oxygen stream and the air stream entering the in the Claus reaction furnace is from about 95 mol % to about 100 mol %;
   providing recycled steam to the Claus reaction furnace;
   providing nonrecycled steam to the Claus reaction furnace, so that the amount of nonrecycled steam is from about 5 moles of steam per 100 moles of acid gas to about 100 moles of steam per 100 moles of acid gas; and
   reacting at a temperature above about 2600° F. and at a pressure sufficient to cause hydrogen sulfide to be converted into sulfur.

15. The method in accordance with claim 14 wherein the concentration of oxygen contained in the sum of the oxygen stream and the air stream is from about 35 mol % to about 95 mol %.

16. The method in accordance with claim 14 wherein the Claus reaction furnace includes a burner and a reaction chamber and the nonrecycled steam is introduced directly into the burner.

17. The method in accordance with claim 14 wherein the Claus reaction furnace includes a burner and a reaction chamber and the nonrecycled steam is combined with one of the gas feed streams rich in hydrogen sulfide, the air, or the oxygen, before being introduced into the burner.

18. The method in accordance with claim 14 wherein the Claus reaction furnace includes a burner and a reaction chamber and the nonrecycled steam is combined with the gas feed stream rich in hydrogen sulfide, before being introduced into the reaction chamber.

19. The method in accordance with claim 14 wherein the amount of nonrecycled steam provided to the Claus reaction furnace is from about 10 moles of steam per 100 moles of acid gas to about 50 moles of steam per 100 moles of acid gas.

* * * * *